United States Patent [19]

Gunlock et al.

[11] 4,065,181

[45] Dec. 27, 1977

[54] CUSHION RETENTION FOR A VEHICLE SEAT

[75] Inventors: Donald E. Gunlock, Birmingham; John A. Manetta, Sterling Heights, both of Mich.

[73] Assignee: General Motors Corporation, Detroit, Mich.

[21] Appl. No.: 718,882

[22] Filed: Aug. 30, 1976

[51] Int. Cl.² ............................................. A47C 7/02
[52] U.S. Cl. ................................... 297/452; 5/353.1; 297/455; 297/460
[58] Field of Search .......................... 5/353.1–353.8; 297/218–220, 391, 396, 452, 455, 456, DIG. 1, DIG. 2, 458–460

[56] References Cited
U.S. PATENT DOCUMENTS

| | | | |
|---|---|---|---|
| 2,135,657 | 11/1938 | Church | 297/396 |
| 2,203,413 | 6/1940 | Hood | 297/412 |
| 3,249,973 | 5/1966 | Seckerson | 24/73 |
| 3,628,830 | 12/1971 | Mitjans | 297/219 X |
| 3,669,498 | 12/1972 | Meyers et al. | 297/460 X |
| 3,695,696 | 10/1972 | Lohr et al. | 297/452 X |
| 3,713,696 | 1/1973 | Dudley | 297/458 X |
| 3,747,978 | 7/1973 | Barecki | 297/445 |
| 3,848,925 | 11/1974 | Harder | 297/452 |

Primary Examiner—James C. Mitchell
Attorney, Agent, or Firm—Charles E. Leahy

[57] ABSTRACT

The support members for a vehicle seat include a molded plastic seat bottom support and a molded plastic seat back support. Cushion members for mounting on the supports include a cushion bun of resilient foam and a seat cover for enveloping the cushion bun. The seat cover has an opening in the underside thereof which permits insertion of the cushion bun when the cushion bun is compressed. A fastening device for mounting the cushion member includes a projecting element, preferably a headed stud, provided on the cushion member. A mating receptacle element, preferably a slot or key hole slot, is provided on the support. The projecting element and the receptacle element are positioned for mating engagement when the cushion bun is forcibly stressed to vary the spaced relation between the fastening devices provided at the respective ends of the cushion member. Termination of the stressing effort applied to the cushion allows the resilience of the cushion bun and the tension exerted thereon by the seat cover to return the ends of the cushion member toward their normal spaced relation so that the projecting elements are captured in their mating receptacle elements to mount the cushion member on the support member. A rigid panel of cardboard or the like is molded in situ on the underface of the cushion bun and has an edge coextensive with the edge of the cushion bun to resist the tension on the seat cover from compressing the corners of the cushion bun. A pair of these rigid panels may be employed which are spaced from one another so as to permit the compression of the cushion member and insertion of the cushion bun into the opening of the seat cover as well as deformation of the cushion bun sufficiently to align the projecting elements and mating receptacle elements of the fastening devices which are mounted on the rigid panels.

6 Claims, 4 Drawing Figures

CUSHION RETENTION FOR A VEHICLE SEAT

The invention relates to a vehicle seat and more particularly provides improved retention of a resilient foam cushion bun and a seat cover on a molded plastic seat support.

It is known to provide a seat having a molded plastic support or frame. It is also known to employ a resilient foam cushion bun mounted on a seat cushion support to enhance the comfort of the seated occupant. It is also common practice to cover a foam cushion bun with a vinyl or cloth seat cover.

The present invention provides an improved retention system for mounting a resilient foam seat cushion bun and a seat cover on a molded plastic seat bottom support and seat back support.

According to the invention, the supporting members of a vehicle seat includes a molded plastic seat bottom support member and a molded plastic seat back support member. Cushion members for mounting on the support members include a cushion bun of resilient foam and a seat cover for enveloping the cushion bun. The seat cover has an opening in the underside thereof which permits insertion of the cushion bun when the cushion bun is compressed. One end of the cushion member is anchored on the support member against movement. The other end of the cushion member is connected to the support member by a fastening device which acts between the support member and the other end of the cushion member. The fastening device includes a projecting element provided on one of the members and a mating receptacle element provided on the other member. The projecting element and the receptacle element are positioned for mating engagement when the cushion bun is forcibly stressed to vary the spaced relation between the anchored end of the cushion member and the other end on which the element of the fastening device is provided. Termination of the stressing effort applied to the cushion allows the resilience of the cushion bun and the tension exerted thereon by the seat cover to return the ends of the cushion member toward their normal spaced relation so that the projecting element is captured in the mating receptacle element to mount the cushion member on the support member.

A rigid panel of cardboard or the like is molded in situ on the underface of the cushion bun and has an edge which is coextensive with the edge of the cushion bun to thereby resist the tendency of the seat cover tension from compressing the corner of the cushion bun. It is preferable that the projecting element of the fastening device be a headed stud which is mounted on the rigid panel and that the receptacle be a key hole slot molded in situ in the molded plastic support member. In the alternative, the receptacle may be provided in the rigid panel, and the headed stud may be molded on the plastic support member.

In the cushion member for a seat bottom it is preferred that first and second rigid panels be employed which are spaced from one another so as to permit the longitudinal compression of the cushion member, thereby permitting insertion of the cushion bun into the opening of the seat cover and also permitting deformation of the cushion bun sufficiently to align the projecting elements and receptacle elements of fastening devices which are provided on both the first and second rigid panels.

In the seat back it is preferred that the upper end of the seat cover be attached to the upper end of the seat back support member and that the lower end thereof be connected by the projecting headed studs mounted on the panel member and engageable in receptacle members which are molded in situ in the plastic seat back support.

One object, feature and advantage of the invention is the provision of matingly engageable projecting elements and receptacle elements provided respectively on a seat cushion member and a seat support member for making a connection therebetween.

A further object, feature and advantage of the invention is the provision of a rigid panel member on the underside of a seat cushion bun to maintain the shape of the bun against the tension applied thereagainst by an enveloping seat cover and to provide a rigid mount for a fastening device by which the cushion member may be mounted on a seat support member.

A further object, feature and advantage of the invention is the provision of a system for retaining a resilient foam cushion member on a molded plastic seat support member wherein the combination of the resilience of the cushion bun and the tension effort of a seat cover cooperate to maintain mating engagement between projecting elements and receptacle elements provided respectively on the cushion member and the molded plastic support member.

A still further object, feature and advantage of the invention is the provision of shape-maintaining rigid panel members secured to the underside of a resilient cushion in spaced apart relation allowing compression of the cushion bun to permit insertion into an undersize opening in a seat cover and permit deformation of the cushion bun sufficient to effect an engagement of a fastening device including mating projecting elements and receptacle elements provided respectively on the panel members and a support member for supporting the cushion bun in a seat.

Another object, feature and advantage of the invention is the provision of a seat cushion member wherein a rigid panel secured to the underface of a cushion bun provides an anchor for securement of the edge portions of an enveloping seat cover and for the mounting of a fastening device for attachment of the cushion member on a seat support member.

These and other features, objects and advantages of the invention are described in the specification and the appended drawings in which.

Figure 1:
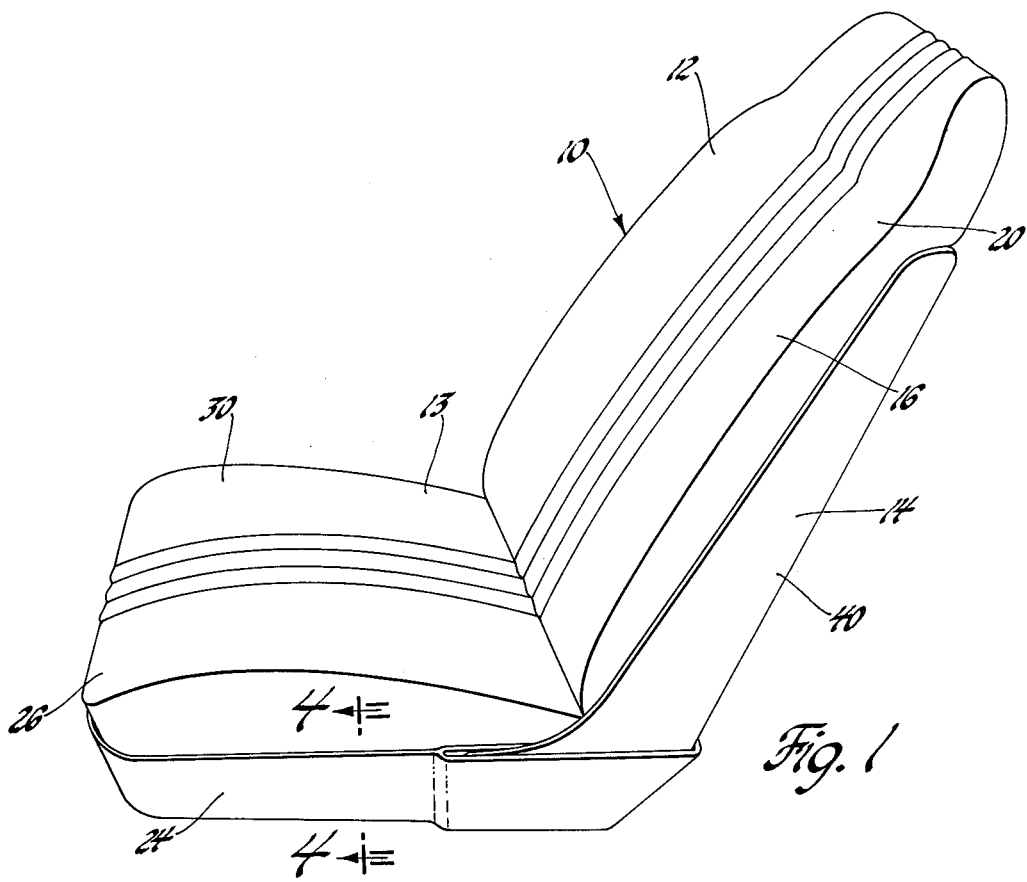
FIG. 1 is a perspective view of a vehicle seat in accordance with the invention.

Referring to FIG. 1, it is seen that a vehicle seat, indicated generally at 10, includes a seat back 12 and a seat bottom 13. The seat back 12 includes a seat back support 14 on which a seat back cushion 16 is mounted. The seat back cushion 16 is comprised of a cushion bun 18 of resilient foam which is enveloped in a vinyl or cloth seat cover 20.

The seat bottom 13 includes a seat bottom support 24 which supports a seat bottom cushion 26. The seat bottom cushion 26 is comprised of a cushion bun 28 of resilient foam and which is enveloped in a vinyl or cloth seat cover 30.

Figure 2:
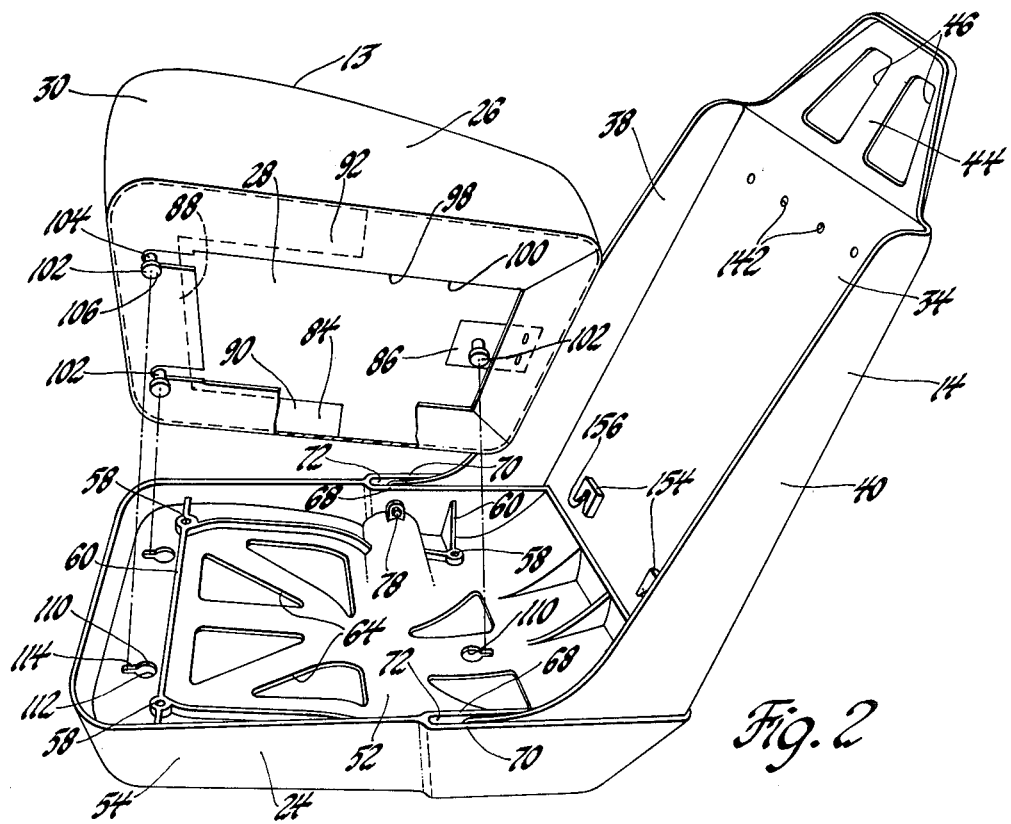
FIG. 2 is an exploded view showing the seat bottom cushion prior to mounting on the seat bottom support.
Figure 3:
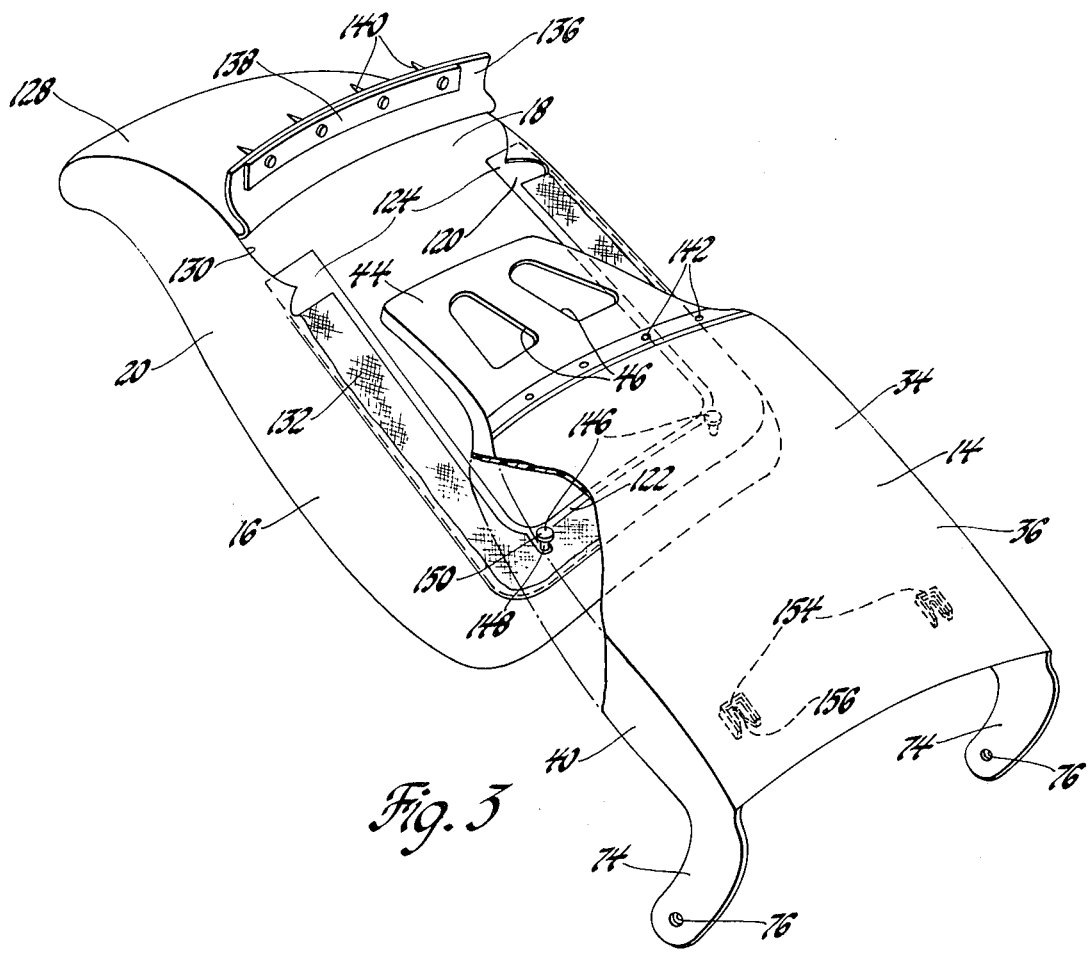
FIG. 3 is an exploded view of the seat back shown prior to mounting of the seat back cushion on the seat back support.

Referring to FIG. 2, it is seen that the seat back support 14 and the seat bottom support 24 are both constructed of an injection molded plastic, preferably a rigid structural foamed plastic. The seat back support 14 includes a generally planar support wall 34 which is adapted to support the seat back cushion 16 against a force applied thereagainst by the seated occupant. As best seen in FIG. 3, the support wall 34 has a decorative surface 36 which faces rearwardly. The seat back support 14 also has sidewalls 38 and 40 which are integrally molded with the back wall 34 at the side edges thereof and extend forwardly and generally perpendicularly therefrom. These sidewalls 38 and 40 contain the edge walls of the seat back cushion 16. The seat back support 14 also has an integrally formed headrest support portion which extends upwardly from the top edge of the support wall 34. The integral headrest support portion 44 may have weight reducing openings 46 formed therein. It will be understood that these weight reducing openings are preferred only in those applications where the seat cover 20 will conceal the presence of the openings from a rear seat occupant.

Referring again to FIG. 2, it is seen that the seat bottom support 24 is constructed in a pan shape with a generally horizontal base wall 52 and a perimeter sidewall 54 which rises generally vertically from the side, front, and rear edges of the base wall 52. The seat bottom support 24 is mounted on the vehicle body by mounting bolts, not shown, which are inserted through holes 58 provided in the base wall 52. The base wall 52 has integrally molded reinforcement bosses 60 which reinforce the base wall 52 and assure proper transference of force loading from the seat bottom support 24 to the mounting bolts and seat adjuster track or floor pan of the vehicle. A plurality of weight saving and material saving openings 64 are provided in the base wall 52. The size, number and location of these openings 64 is dependant upon the maintenance of adequate strength of the seat bottom support 24.

As best seen in FIG. 2, the perimeter sidewall 54 includes laterally spaced inner and outer wall portions 68 and 70 at each side which cooperate to define a well or pocket 72. The wells 72 are adapted to receive pivot arms 74 which extend downwardly and forwardly of the seat back support 14 as best seen in FIG. 3. Each of the pivot arms 74 has a pivot aperture 76 which is aligned with a mating aperture formed in the inner wall portion 68 of the seat bottom support 24. Selftapping pivot bolts 78 are installed through these aligned apertures to effect a pivotal connection of the seat back support 14 on the seat bottom support 24. Accordingly, the seat back 12 can be pivoted forwardly over the seat bottom 13 to facilitate the ingress and egress of an occupant of a seat located rearwardly of the seat 10.

If desired, a seat back latch can be provided between the seat back support 14 and the seat bottom support 24. A seat back latch particularly suited for this application is the subject of copending patent application Serial No. 553,298 by Arlauskas et al and assigned to the assignee of this invention. It will be understood that there are seating applications in which this pivoting movement of the seat back is not necessary. In those instances the seat back support 14 may be molded integrally with the seat bottom support 24 or may be permanently attached thereto as by bolting.

Figure 4:
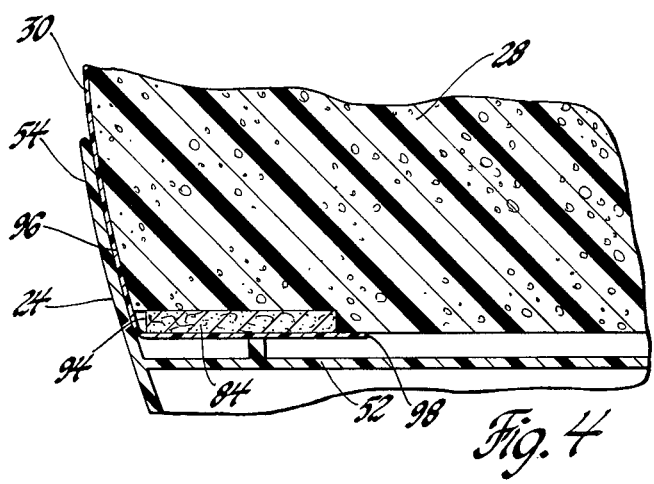
FIG. 4 is a fragmentary cross sectional view taken through the seat bottom cushion in the direction of arrows 4—4 of FIG. 1.

Referring to FIGS. 2 and 4, it is seen that the undersurface of the resilient cushion bun 28 has a pair of rigid panels 84 and 86 attached thereto. The panels 84 and 86 are preferably a heavy cardboard or the like and are preferably attached to the cushion bun 28 by being molded in place, but may in the alternative be adhesively secured. The panel 84 is generally U-shaped and has a forward portion 88 and rearwardly extending legs 90 and 92. As best seen in FIGS. 2 and 4, the outer edge wall 94 of the panel 84 is generally coextensive with the edge wall 96 of cushion bun 28 and the perimeter sidewall 54 of the seat bottom support 24. The panel 86 is mounted on the cushion bun 28 at a spaced relation from the panel 84 so that the presence of the panels 84 and 86 attached to the cushion bun 28 does not impair longitudinal compression and/or stretching of the cushion bun 28.

The seat cover 30 is sewn together prior to being mounted over the cushion bun 28 and has an opening 98 in the underside thereof which is defined by the edge portion 100 of the seat cover 30. The spaced relation of the panels 84 and 86 permits compression of the cushion bun 28 sufficiently to permit its insertion through the opening 98 in the seat cover 30. Accordingly, upon temination of such compression, the resilience of the cushion bun 28 expands it towards its natural size which exceeds the size of the seat cover opening 98. The edge portion 100 of the seat cover 30 is then attached to the rigid panels 84 and 86 as by staples or adhesive.

The seat bottom cushion 26 is mounted on the seat bottom support 24 by mating projections and receptacles provided respectively on the seat bottom cushion 26 and the seat bottom support 24. As best seen in FIG. 2, a pair of headed studs 102 are attached to the forward portion 88 of the panel 84. A similar headed stud 102 is attached to the panel 86. Each of the headed studs 102 has a shank portion 104 which preferably has an integrally formed self-tapping screw portion which facilitates its attachment to the respective panel 84 or 86. The headed studs 102 also have a head 106 which is spaced from the panel 84 by the shank portion 104 and which has a diameter larger than the shank portion 104. The panels 84 and 86 may have perforated holes therein to receive the self-tapping headed studs 102. These perforated holes are conveniently engageable over locating pins provided in the cushion bun mold so that the locational relationship between the headed studs is assured.

As seen in FIG. 2, a plurality of key hole slots 110 are provided in the base wall 52 of the seat bottom support 24. Each of the key hole slots 110 includes an enlarged circular entry opening 112 which is sized to receive the head 106 of the headed studs 102. Each of the key hole slots 110 also has a narrow slot portion 114 which extends longitudinally from the entry opening 112 and has a lateral extent corresponding to the diameter of the shank portion 104 of the headed studs 102. Accordingly, an attachment may be effected between the seat bottom cushion 26 and the seat bottom support 24 by lowering the seat bottom cushion 26 into the seat bottom support 24 with the heads 106 of the headed studs 102 aligned with the entry openings 112 of the key hole slots 110, and then moving the headed studs 102 so that their shank portions 104 enter the slot portions 114 of the heads 106 and become engaged against the underside of the base wall 52. The seat bottom cushion 26 is most conveniently installed by first inserting the headed stud 102 mounted on panel 86 into its mating key hole slot 110 and then pushing the forward end of the seat bottom cushion 26 rearwardly to align the headed studs 102 mounted on the panel 84 with their mating key hole slots 110. Termination of the compressive effort then allows movement of the panel 84 forwardly to complete the engagement of the headed studs 102 in the slot portions 114 of the key hole slots 110.

The relative relationship between the headed studs 102 and the location and orientation of the key hole slots 110 is selected to that the resilience of the cushion bun 28 will continuously bias the headed studs 102 in the direction to effect their retention in the key hole slots 110. As seen in FIG. 2, the slot portions 114 of the key hole slots 110 located at the forward end of the seat bottom support extend forwardly from their respective entry openings 112. The slot portion 114 of the key hole slot 110 at the rearward end of the seat and bottom support extends rearwardly. The relative spacings between the headed studs 102 and the entry openings 112 of the key hole slots 110 is such that the cushion bun 28 must be longitudinally compressed in order to align the heads 106 with the entry openings 112. Termination of the longitudinal compression allows the resilience of the cushion bun 28 to bias the panels 84 and 86 in the opposite directions to maintain each of the headed studs 102 engaged within the slot portions 114 of their mating key hole slots 110.

Simultaneously, it will be understood that the cushion bun 28 is somewhat compressed within the seat cover 30 so that it exerts an effort on the seat cover 30 in the direction which would tend to enlarge the opening 98 in the underside of the seat cushion. This effort is transferred to the panels 84 and 86 by the staples or adhesive in connection therebetween. Accordingly, the tension on the seat cover 20 also tends to urge the panels 84 and 86 in the direction maintaining engagement of the headed studs 102 in the key hole slots 110. Furthermore, this tension of the seat cover tends to alter the shape of the cushion bun 28 by compressing the corner of the bun adjacent the juncture of the seat bottom support base wall 52 and perimeter sidewall 54. However, the coextensive relation between the edge wall 94 of panel 84 and the edge wall 96 of cushion bun 28 defines the shape of the seat bottom cushion 26 and prevents the tension on the seat cover 30 from misshaping the bottom of the cushion bun 28.

Accordingly, longitudinal compression of the cushion bun 28 is required to mount or demount the seat bottom cushion 26 on a seat bottom support 24. The seat bottom cushion 26 can be installed or removed from the support without any tools. This provides an important economy in the assembly of the seat as well as permitting the seat bottom cushion to be easily removed for cleaning or replacement.

Referring to FIGS. 2 and 3, the manner in which the seat back cushion 16 is attached to the seat back support 14 will be described. As best seen in FIG. 3, the seat back cushion bun 18 has a generally U-shaped rigid panel 120 attached thereto. The panel 120 has a transversely extending lower portion 122 and spaced apart upwardly extending legs 124. The outer edge wall of the panel 120 is generally coextensive with the edge of the cushion bun 18. The seat cover 20 is sewn together prior to being mounted over the cushion bun 18 and has an integral headrest covering portion 128 at the upper end thereof for covering a headrest portion of the cushion bun 18. Seat cover 20 has an opening in the back side thereof which is defined by an edge wall 130 of the seat cover 20. A cloth strip 132 is sewn along the edge 130 of seat cover 20. The panel 120 permits compression of the cushion bun 18 sufficiently to permit its insertion through the opening defined by edge wall 130 of the seat cover 20 and the cloth strip 132. Then, upon termination of such compression, the resilience of the cushion bun 18 expands it toward its natural size which exceeds the size of the seat cover opening. The cloth strip 132 is then attached to the panel 120 by stapling or an adhesive. The use of a cloth strip 132 results in a savings of the more expensive material of the seat cover 20.

Subsequent to the insertion of the cushion bun 18 into the seat cover 20 and the attachment of the cloth strip 132 to the panel 120, the seat back cushion 16 is installed over the seat back support 14 as best seen in FIG. 3. The integral headrest support portion 44 of the seat back support 14 is inserted into the seat back cushion 16 between the integral headrest portion of the cushion bun 18 and the integral headrest covering portion 128 of the seat cover 20. A flap portion 136 of the seat cover 20 has a plastic reinforcement strip 138 which carries a plurality of snap-in fasteners 140. The flap portion is folded over to conceal the reinforcement strip 138 and the snap-in fasteners 140 are engaged in a plurality of mating holes 142 provided in the generally planar support wall 34 of the seat back support 14. Accordingly, the upper end of the seat back cushion 16 is anchored to the seat back support 14.

The lower end of the seat back cushion 16 is attached to the seat back support 14 by mating projections and receptacles provided respectively on the seat back cushion 16 and the seat back support 14. As seen in FIG. 3, a pair of headed studs 146 are attached to the lower portion 122 of the panel 120. Each of the headed studs 146 has a shank portion 148 which preferably has an integrally formed self-tapping screw by which it is attached to the panel 120. The headed studs 146 also have an enlarged head 150 which is spaced from the panel 120 by the shank portion 148 and which has a diameter larger than the diameter of the shank portion.

As best seen in FIGS. 2 and 3, a pair of receptacles 154 are provided on the back wall 34 of the seat back support 14. These receptacles 154 are molded integrally with the seat back support member and provide downwardly opening slots 156 which receive the headed studs 146. Accordingly, attachment of the seat back cushion 16 is completed by stretching the seat back cushion 16 downwardly sufficiently to align the headed studs 146 with the downwardly opening entry slot 156 provided by the receptacles 154. When the stretching effort is relieved from the lower portion of the seat back cushion 16, the resilience of the cushion bun 18 and the seat cover 20 move the panel 120 and the headed studs 146 upwardly so that the shank portion 104 enters the slot portion 156 and the head 150 becomes engaged in the receptacles 154.

The location of the headed studs 146 relative the location and orientation of the receptacles 154 is selected so that the resilience of the cushion bun 18 and seat cover 20 will continuously bias the panel 120 and headed studs 146 in the direction to effect their retention in the receptacles 154.

In the preferred embodiment of the invention the receptacles are integrally molded with the plastic seat bottom support and the seat back support while the projecting elements are provided on the cushion bun mounted panel member. In the alternative, the projecting element could be molded into the support and the receptacle could be provided in the panel. Furthermore, it will be understood that the seat bottom cushion could be mounted according to the manner shown herein for mouting of the seat back cushion. On the other hand, the seat back cushion could be mounted by the method shown for the seat bottom cushion.

Thus, the invention provides improved retention of a resilient cushion bun and seat cover on a molded plastic seat support frame.

The embodiments of the invention in which an exclusive property or privilege is claimed are defined as follows:

1. A vehicle seat back comprising:
  a molded plastic frame member having a forwardly facing cushion supporting face and a rearwardly facing decorative face;
  a headrest support portion integral with the frame member and extending upwardly therefrom;
  a cushion member having a cushion bun of resilient foam and a seat cover enveloping the cushion bun and having an opening in the rearward face thereof defined by edge portions of the seat cover;
  said seat cover being engaged over the integral headrest portion of the frame member and fastened thereto;
  and fastening means acting respectively between the frame member and the cushion member, said fastening means including a projecting element mounted on one of the members and a mating receptacle element provided on the other member, the fastening means being engageable when the cushion member is stressed longitudinally to move the element mounted on the cushion member in the direction away from the integral headrest support portion, the projecting element being engaged in the mating receptacle element when the resilience of the cushion bun moves the element mounted on the cushion member in the direction toward the integral headrest portion.

2. A seat comprising:
  a cushion bun of resilient foam having a leading edge portion and side edge portions;
  a support member having a generally planar base wall to support the cushion bun and sidewalls rising generally perpendicularly from the base wall adjacent the side edge portions of the cushion bun to support the side edges of the cushion bun;
  first and second rigid panel members respectively secured to the cushion bun and being spaced from one another to permit longitudinal compression of the cushion bun, the first rigid panel member being generally U-shaped;
  a seat cover for enveloping the cushion bun and having an opening in the underside thereof of a size sufficient to permit insertion of the cushion bun only when the cushion bun is compressed, the cushion bun being compressed somewhat within the seat cover to exert a tension on the seat cover;
  attachement means acting between the seat cover and the first and second rigid panel members to attach the seat cover to the cushion bun;
  said U-shaped first rigid panel having an outer edge coextensive with the leading and side edge portions of the cushion bun to provide rigidity and prevent the tension of the seat cover from altering the shape of the cushion bun by compressing the edge portions of the cushion bun;
  and fastening means acting between the support member and the first and second rigid panel members to mount the cushion bun on the support member.

3. A seat comprising:
  a support member;
  a cushion bun of resilient foam for mounting on the support member;
  first and second rigid panel members respectively secured to the cushion bun and being longitudinally spaced from one another to permit longitudinal compression of the cushion bun;
  and fastening means acting respectively between the support member and the first and second panel members, said fastening means including a projecting element mounted on one of the members and a mating receptacle element provided on the other member, the fastening means being engageable when the cushion bun is compressed longitudinally to move the elements mounted on the panel members into closer longitudinally spaced relation and the projecting elements being captured in the mating receptacle elements when the resilience of the cushion bun moves the first and second panel members to further apart longitudinally spaced relation.

4. A seat structure comprising:
  a support member;
  a cushion bun of resilient foam for mounting on the support member;
  a seat cover for enveloping the cushion bun and having an opening in the underside thereof having a size sufficient to permit insertion of the cushion bun only when the cushion bun is compressed;
  first and second rigid panel members respectively secured to longitudinally spaced opposite edge portions of the cushion bun and being longitudinally spaced from one another to permit longitudinal compression of the cushion bun;
  and fastening means acting respectively between the support member and the first and second panel members, each such fastening means including a projecting element provided on one of the members and a mating receptacle element provided on the other member, the fastening means being positioned for mating engagement when the cushion bun is compressed longitudinally to move the elements mounted on the panel members into closer longitudinally spaced relation, the projecting elements being captured in the mating receptacle elements when the longitudinal compression is relieved and the resilience of the cushion bun moves the first and second panel members to further apart longitudinally spaced relation.

5. A seat comprising:
  a molded plastic support member;
  a cushion bun of resilient foam for mounting on the support member;
  first and second panel members respectively secured to longitudinally spaced opposite edge portions of the cushion bun and being longitudinally spaced from one another to permit longitudinal compression of the cushion bun;
  a headed stud mounted on each of the panel members and having a relatively narrow shank and a larger head;
  key hole slots provided at longitudinally spaced positions in the molded plastic support member for receiving the headed studs, each of the key hole slots having an entry opening adapted to permit insertion of the head of the headed stud and a relatively narrow longitudinally extending opening adapted to receive the shank of the headed stud so that the head of the headed stud overlies the undersurface of the support member to attach the panel member and the cushion bun on the support member, the key hole slots being arranged with the longitudinally extending openings pointing outwardly toward the edge portion of the support member and being positioned with respect to the headed studs so that when the cushion bun is longitudinally compressed the heads of the headed studs are spaced relative one another for entry into the entry openings of the key hole slots and when the cushion bun is expanded the headed studs are located with the shank portion received in the longitudinally extending opening to attach the cushion bun on the support member.

6. In a seat, the combination comprising:

a cushion bun of resilient foam having an underface and an edge wall;

a support member having a generally planar support wall adapted for supporting engagement by the underface of the cushion bun and having sidewalls extending generally perpendicularly from the support wall adjacent the edge wall of the cushion bun to support the edge wall of the cushion bun;

a seat cover for enveloping the cushion bun and having an opening in the underside thereof overlying the support wall of the support member and having a size sufficient to permit insertion of the cushion bun only when the cushion bun is compressed, the cushion bun being in a somewhat compressed state when installed within the seat cover so that the seat cover and cushion bun exert opposing forces on one another;

rigid panel means secured to the underface of the cushion bun along only a portion thereof not interfering with compression of the cushion bun sufficient to permit insertion of the cushion bun into the seat cover;

attachment means acting between the seat cover and the rigid panel means to attach the seat cover to the cushion bun;

and fastening means acting between the support member and the rigid panel means to mount the cushion bun on the support member;

the rigid panel means having an outer edge being generally coextensive with the edge wall of the cushion bun to provide rigidity and prevent the opposing forces imposed by the seat cover and cushion bun from altering the shape of the cushion bun by compressing of the cushion bun at the juncture between the underface and edge wall.

* * * * *